United States Patent
Griffin et al.

(10) Patent No.: US 12,223,297 B2
(45) Date of Patent: Feb. 11, 2025

(54) DYNAMIC QUANTUM COMPUTING SYSTEM SELECTION AND QUANTUM PROGRAM COMPILATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 82 days.

(21) Appl. No.: 17/685,532

(22) Filed: Mar. 3, 2022

(65) Prior Publication Data

US 2023/0280988 A1    Sep. 7, 2023

(51) Int. Cl.
*G06F 8/41* (2018.01)
*G06N 10/80* (2022.01)

(52) U.S. Cl.
CPC .............. *G06F 8/41* (2013.01); *G06N 10/80* (2022.01)

(58) Field of Classification Search
None
See application file for complete search history.

(56) References Cited

U.S. PATENT DOCUMENTS

| | | | |
|---|---|---|---|
| 10,360,088 B2 | 7/2019 | Wallman et al. | |
| 10,678,677 B1 * | 6/2020 | Kuris | G06F 11/3624 |
| 10,831,455 B2 | 11/2020 | Gambetta et al. | |
| 10,956,830 B1 | 3/2021 | Rigetti et al. | |
| 10,977,570 B2 | 4/2021 | Smith et al. | |
| 11,010,145 B1 | 5/2021 | Smith et al. | |
| 2018/0260730 A1 | 9/2018 | Reagor et al. | |
| 2019/0155970 A1 * | 5/2019 | Matthews | G06F 30/20 |
| 2021/0012233 A1 * | 1/2021 | Gambetta | G06F 8/44 |
| 2021/0064350 A1 * | 3/2021 | Cao | G06F 8/447 |
| 2021/0373860 A1 * | 12/2021 | Khan | G06F 9/546 |

OTHER PUBLICATIONS

Karalekas, P.J. et al., "A quantum-classical cloud platform optimized for variational hybrid algorithms," arXiv:2001.04449v3 [quant-ph], May 31, 2020, 21 pages.
Sivarajah, S. et al., "t|ket⟩: A Retargetable Compiler for NISQ Devices," arXiv:2003.10611v3 [quant-ph], Apr. 24, 2020, 43 pages.

* cited by examiner

*Primary Examiner* — Lewis A Bullock, Jr.
*Assistant Examiner* — Mark A Gooray
(74) *Attorney, Agent, or Firm* — Dority & Manning, P.A.

(57) ABSTRACT

A first plurality of programming instructions written in a first quantum programming language is accessed. A first quantum computing system is selected from a plurality of quantum computing systems based on an attribute of the first quantum computing system. A second plurality of programming instructions is generated based on the first plurality of programming instructions and a characteristic of the first quantum computing system, at least one programming instruction in the second plurality of programming instructions being a translation of a corresponding programming instruction in the first plurality of programming instructions.

20 Claims, 4 Drawing Sheets

DYNAMIC QUANTUM COMPUTING SYSTEM SELECTION AND QUANTUM PROGRAM COMPILATION

BACKGROUND

Quantum computing is becoming more prevalent, but substantial standardization across different quantum computing platforms has not yet occurred.

SUMMARY

The examples disclosed herein implement dynamic quantum computing system selection and quantum program compilation.

In one example a method is provided. The method includes accessing, by a computing device comprising a processor device, a first plurality of programming instructions written in a first quantum programming language. The method further includes selecting, by the computing device, a first quantum computing system from a plurality of quantum computing systems based on an attribute of the first quantum computing system. The method further includes generating a second plurality of programming instructions based on the first plurality of programming instructions and a characteristic of the first quantum computing system, at least one programming instruction in the second plurality of programming instructions being a translation of a corresponding programming instruction in the first plurality of programming instructions.

In another example a computing device is provided. The computing device includes a memory, and a processor device coupled to the memory. The processor device is to access a first plurality of programming instructions written in a first quantum programming language. The processor device is further to select a first quantum computing system from a plurality of quantum computing systems based on an attribute of the first quantum computing system. The processor device is further to generate a second plurality of programming instructions based on the first plurality of programming instructions and a characteristic of the first quantum computing system, at least one programming instruction in the second plurality of programming instructions being a translation of a corresponding programming instruction in the first plurality of programming instructions.

In another example a non-transitory computer-readable storage medium is provided. The non-transitory computer-readable storage medium includes executable instructions to cause a processor device to access a first plurality of programming instructions written in a first quantum programming language. The instructions further cause the processor device to select a first quantum computing system from a plurality of quantum computing systems based on an attribute of the first quantum computing system. The instructions further cause the processor device to generate a second plurality of programming instructions based on the first plurality of programming instructions and a characteristic of the first quantum computing system, at least one programming instruction in the second plurality of programming instructions being a translation of a corresponding programming instruction in the first plurality of programming instructions.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing is becoming more prevalent, but substantial standardization across different quantum computing platforms has not yet occurred. Quantum computing systems typically implement a particular operating system that has certain characteristics that require quantum programming languages to be written for that specific quantum computing system. Moreover, quantum computing systems sometimes utilize native quantum programming compilers that require programming instructions be written in a particular quantum programming language in order for the quantum program to be executed on the quantum computing system. For example, some quantum computing systems utilize a Qiskit quantum programming language, while other quantum computing systems utilize a QCL quantum programming language.

The nuances of different quantum computing systems make it impractical or impossible to implement load balancing of quantum computing programs across different types of quantum computing systems (e.g., heterogenous) because quantum programs are written for a particular quantum computing system. Thus, even if a first quantum computing system is relatively unused, if a quantum computing program was written for a second quantum computing system that is dissimilar from the first quantum computing system, the program cannot be executed on the first quantum computing system without being modified. Even quantum computing systems that utilize the same native programming language can require different syntax for certain actions, such as the allocation of a qubit or access of a qubit. The requirement that a program be written for a particular quantum computing system inhibits the ability to dynamically select, from a plurality of heterogenous quantum computing systems, a particular quantum computing system on which to initiate a quantum computing program.

The examples disclosed herein implement dynamic quantum computing system selection and quantum program compilation. The examples access a first plurality of programming instructions that are configured to access a qubit on a quantum computing system. A quantum computing system is selected from a plurality of quantum computing systems based on an attribute of the quantum computing system. A second plurality of programming instructions is generated based on the first plurality of programming instructions and a characteristic of the quantum computing system, at least one programming instruction in the second plurality of programming instructions being a translation of a corresponding programming instruction in the first plurality of programming instructions. In this manner, the programming instructions written for a particular quantum computer system are automatically translated to successfully compile and execute on any of a plurality of heterogenous quantum computing systems.

Figure 1:
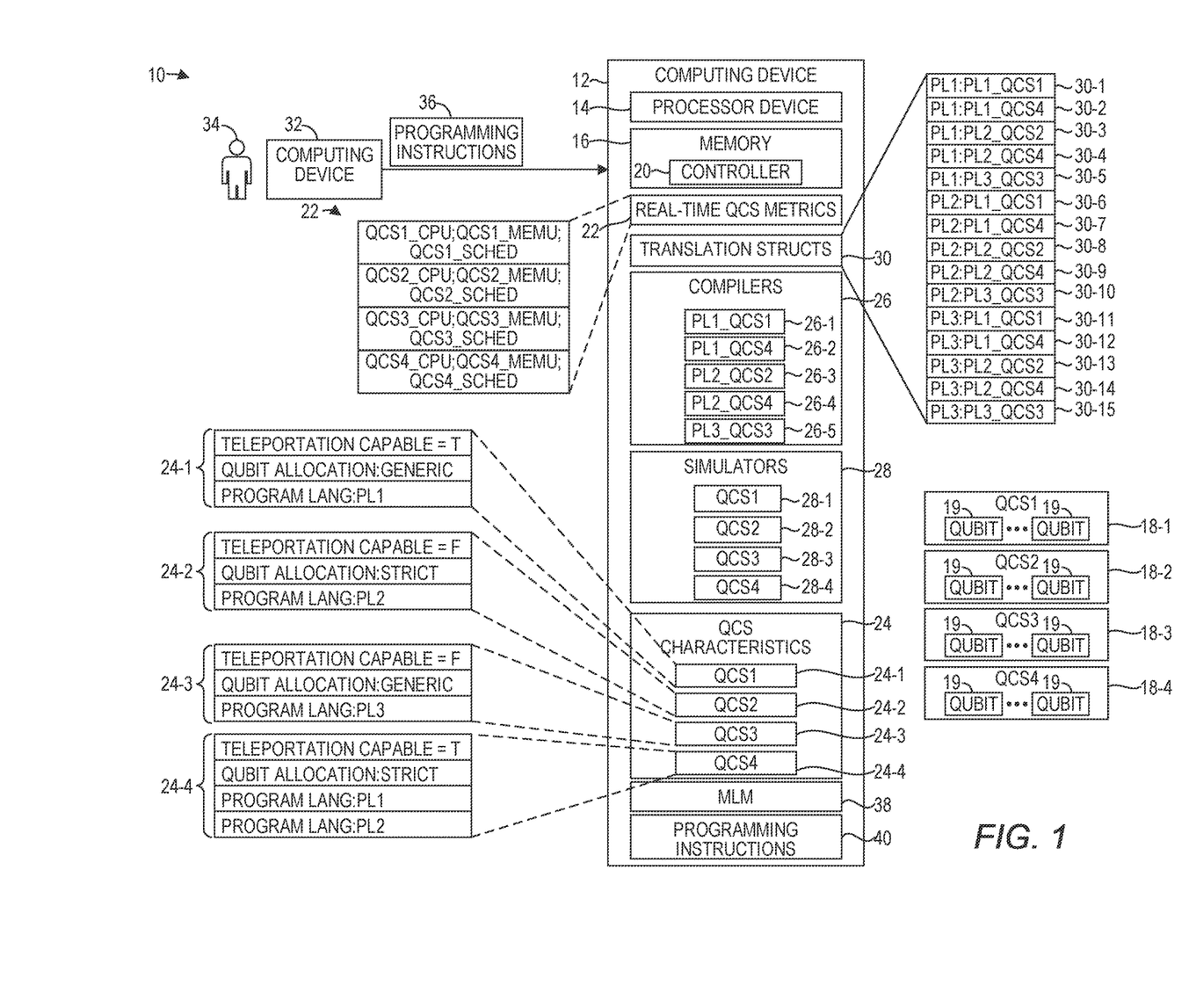
FIG. 1 is a block diagram of an environment suitable for implementing dynamic quantum computing system selection and quantum program compilation according to one example.

FIG. 1 is a block diagram of an environment 10 suitable for implementing dynamic quantum computing system selection and quantum program compilation according to one example. The environment 10 includes a computing device 12, illustrated here as a classical computing device, that includes a processor device 14 and a memory 16. While aspects of the examples disclosed herein are illustrated as being implemented on the classical computing device 12, in other implementations the examples may be implemented on a quantum computing system.

The environment 10 also includes a plurality of quantum computing systems 18-1-18-4 (generally, quantum computing systems 18), each of which includes a processor device and a memory. The quantum computing systems 18 also each implement a plurality of qubits 19. The quantum computing systems 18 operate in quantum environments but are capable of operating using classical computing principles or quantum computing principles. When using quantum computing principles, the quantum computing systems 18 perform computations that utilize quantum-mechanical phenomena, such as superposition and/or entanglement states. The quantum computing systems 18 may operate under certain environmental conditions, such as at or near zero degrees (0°) Kelvin. When using classical computing principles, the quantum computing systems 18 utilize binary digits that have a value of either zero (0) or one (1).

The quantum computing systems 18 may be heterogenous, and execute different operating systems, or differ in other ways, such as which quantum programming language (s) are supported, and/or what quantum services are offered. Each quantum computing system 18 may be operated by a different entity or the same entity. The term "quantum programming language" as used herein refers to a programming language that includes instructions that allow manipulation of a qubit. Examples of quantum programming languages include, by way of non-limiting example, QCL, Q #, QMASM, Scaffold, Silq, and the like.

A controller 20 executes on the computing device 12 and may obtain real-time metrics 22 from the quantum computing systems 18. The controller 20 may periodically poll the quantum computing systems 18 for the real-time metrics 22, such as every five seconds, 10 seconds, or the like. Alternatively, the controller 20 may obtain the real-time metrics 22 in response to some event, such as the imminent scheduling of a quantum computing program for execution on one of the quantum computing systems 18. The real-time metrics 22 may include, for example, a current processor utilization of the quantum computing systems 18, the current memory utilization of the quantum computing systems 18, and a current schedule of quantum programs to be executed on the quantum computing systems 18.

The controller 20 has access to quantum computing system characteristics 24 that maintain characteristics of the quantum computing systems 18. A quantum computing system characteristics entry 24-1 corresponds to the quantum computing system 18-1 and indicates that the quantum computing system 18-1 is capable of offering a teleportation service that operates to teleport characteristics of a qubit implemented by the quantum computing system 18-1 to a qubit implemented by another quantum computing system. The quantum computing system characteristics entry 24-1 also indicates that the quantum computing system 18-1 has a generic qubit allocation mechanism wherein a quantum program need not specify a particular qubit for allocation, but may request qubits generically, and, in response, the quantum computing system 18-1 will identify available qubits and allocate them to the quantum program. The quantum computing system characteristics entry 24-1 includes a quantum programming language identifier that indicates that the quantum computing system 18-1 utilizes a native PL1 quantum programming language.

A quantum computing system characteristics entry 24-2 corresponds to the quantum computing system 18-2 and indicates that the quantum computing system 18-2 does not offer a teleportation service. The quantum computing system characteristics entry 24-2 also indicates that the quantum computing system 18-2 has a strict qubit allocation mechanism wherein a quantum program need specify a particular qubit for allocation. The quantum computing system characteristics entry 24-2 also includes a quantum programming language identifier that indicates that the quantum computing system 18-2 utilizes a native quantum programming language titled "PL2".

A quantum computing system characteristics entry 24-3 corresponds to the quantum computing system 18-3 and indicates that the quantum computing system 18-3 does not offer a teleportation service. The quantum computing system characteristics entry 24-3 also indicates that the quantum computing system 18-3 has the generic qubit allocation mechanism wherein the quantum program need not specify a particular qubit for allocation. The quantum computing system characteristics entry 24-3 also includes a quantum programming language identifier that indicates that the quantum computing system 18-3 utilizes a native quantum programming language titled "PL3". It is noted that the terms "PL1", "PL2", and "PL3" in conjunction with a quantum programming language is simply to distinguish the quantum programming languages from one another and is not the name of an actual quantum programming language. For example, the quantum programming language referred to herein as "PL1" may in practice correspond to any quantum programming language, and the quantum programming language referred to herein as "PL2" may in practice correspond to any other quantum programming language.

A quantum computing system characteristics entry 24-4 corresponds to the quantum computing system 18-4 and indicates that the quantum computing system 18-4 is capable of offering the teleportation service that operates to teleport characteristics of a qubit to a qubit implemented by another quantum computing system. The quantum computing system characteristics entry 24-4 also indicates that the quantum computing system 18-4 has a strict qubit allocation mechanism wherein a quantum program need specify a particular qubit for allocation. The quantum computing system characteristics entry 24-4 also includes quantum programming language identifiers that indicate that the quantum computing system 18-4 utilizes two quantum programming languages titled "PL1" and "PL2". It is noted that the PL1 quantum programming language identified in the quantum computing system characteristics entry 24-4 is the same quantum programming language, such as by way of non-limiting example, Qiskit, that is indicated by the quantum computing system characteristics entry 24-1. However, certain programming instructions may differ depending on whether the quantum program is to be initiated on the quantum computing system 18-1 or the quantum computing system 18-4. For example, the exact Qiskit programming instructions for allocating a qubit may differ. Accordingly, programming instructions written in the PL1 quantum programming language for the quantum computing system 18-1 may need at least some modifications in order to successfully execute on the quantum computing system 18-4.

Similarly, it is noted that the PL2 quantum programming language identified in the quantum computing system characteristics entry 24-4 is the same PL2 quantum programming language that is indicated by the quantum computing system characteristics entry 24-2. However, certain programming instructions may differ depending on whether the quantum program is to be initiated on the quantum computing system 18-2 or the quantum computing system 18-4.

The controller 20 has access to a plurality of compilers 26 that are configured to receive a plurality of programming instructions generated in accordance with a syntax for a particular quantum programming language. If a compiler 26 determines that the plurality of programming instructions comply with the syntax, then the compiler 26 outputs a file, or files, that are suitable for execution on a particular quantum computing system 18. If the compiler 26 determines that any of the plurality of programming instructions do not comply with the syntax, then the compiler 26 outputs information that identifies the programming instruction(s) that do not comply with the syntax.

In this example, the compilers 26 include a compiler 26-1 that is configured to verify the syntax of programming instructions written in the PL1 quantum programming language for the quantum computing system 18-1, a compiler 26-2 that is configured to verify the syntax of programming instructions written in the PL1 quantum programming language for the quantum computing system 18-4, a compiler 26-3 that is configured to verify the syntax of programming instructions written in the PL2 quantum programming language for the quantum computing system 18-2, a compiler 26-4 that is configured to verify the syntax of programming instructions written in the PL2 quantum programming language for the quantum computing system 18-4, and a compiler 26-5 that is configured to verify the syntax of programming instructions written in the PL3 quantum programming language for the quantum computing system 18-3.

The controller 20 has access to a plurality of simulators 28 that operate to simulate the execution of quantum computing programs that have been compiled by a compiler 26 for a particular quantum computing system 18. The simulators 28 can output information that indicates whether a quantum computing program may successfully execute on a particular quantum computing system 18. The simulator 28-1 is configured to simulate a quantum computing program that has been compiled to execute on the quantum computing system 18-1; the simulator 28-2 is configured to simulate a quantum computing program that has been compiled to execute on the quantum computing system 18-2; the simulator 28-3 is configured to simulate a quantum computing program that has been compiled to execute on the quantum computing system 18-3; and the simulator 28-4 is configured to simulate a quantum computing program that has been compiled to execute on the quantum computing system 18-4.

The controller 20 has access to translation structures 30 that are used by the controller 20 to translate programming instructions written in a particular quantum programming language for a particular quantum computing system 18 to be suitable for execution for a different quantum computing system 18. The translation may be a translation from one quantum programming language to another quantum programming language or may comprise the translation of only certain programming instructions written in a particular quantum programming language for a particular quantum computing system 18 to different programming instructions written in the particular quantum programming language for a different quantum computing system 18.

The translation structures 30 include translation structures 30-1-30-5 that facilitate the translation of programming instructions written in the PL1 quantum programming language to programming instructions written in various quantum programming languages and for various quantum computing systems 18. As an example, the translation structure 30-1 facilitates the translation of programming instructions written in the quantum programming language "PL1", (e.g., the Qiskit quantum programming language), to programming instructions written in the PL1 quantum programming language specifically for the quantum computing system 18-1. This particular translation may comprise simply altering certain programming instructions that are specific to the quantum computing system 18-1. The translation structure 30-2 facilitates the translation of programming instructions written in the PL1 quantum programming language to programming instructions written in the PL1 quantum programming language specifically for the quantum computing system 18-4. Again, this particular translation may comprise simply altering certain programming instructions that are specific to the quantum computing system 18-4.

The translation structure 30-3 facilitates the translation of programming instructions written in the PL1 quantum programming language to programming instructions written in the quantum programming language "PL2" specifically for the quantum computing system 18-2. This particular translation may comprise generating entirely new programming instructions in the PL2 quantum programming language for the quantum computing system 18-2 based on the programming instructions written in the PL1 quantum programming language.

The translation structure 30-4 facilitates the translation of programming instructions written in the PL1 quantum programming language to programming instructions written in the quantum programming language "PL2" specifically for the quantum computing system 18-4. Again, this particular translation may comprise generating entirely new programming instructions in the PL2 quantum programming language for the quantum computing system 18-4 based on the programming instructions written in the PL1 quantum programming language. The translation structure 30-5 facilitates the translation of programming instructions written in the PL1 quantum programming language to programming instructions written in the PL3 quantum programming language specifically for the quantum computing system 18-3. This particular translation may comprise generating entirely new programming instructions in the quantum programming language PL3 for the quantum computing system 18-3 based on the programming instructions written in the PL1 quantum programming language.

Similarly, the translation structures 30-6-30-10 facilitate the translation of programming instructions written in the PL2 quantum programming language to programming instructions written in various quantum programming languages for various quantum computing systems 18, and the translation structures 30-11-30-15 facilitate the translation of programming instructions written in the PL3 quantum programming language to programming instructions written in various quantum programming languages for various quantum computing systems 18.

The environment 10 also includes a plurality of computing devices 32 that periodically or intermittently provide, to the controller 20, a plurality of programming instructions written in a quantum programming language. The computing devices 32 may send the programming instructions to the controller 20, or provide the controller 20 with information, such as a uniform resource identifier, via which the controller 20 may obtain the programming instructions. In this example, the controller 20 desires to load balance quantum programs across the quantum computing systems 18. The controller 20 accesses the programming instructions and selects a particular quantum computing system 18 based on an attribute of the quantum computing system 18. The controller 20 then generates, based on the programming instructions, a second plurality of programming instructions that are suitable for the selected quantum computing system 18. The controller 20 selects a particular compiler 26 and causes the compiler 26 to compile the second plurality of programming instructions. If the compiler 26 successfully compiles the second plurality of programming instructions, the compiler 26 generates an output file. The controller 20, in some examples, may select the simulator 28 that corresponds to the selected quantum computing system 18 and provide an output file to the simulator 28 to cause the simulator to simulate an execution of the output file on the selected quantum computing system 18. If the output file successfully executes in the simulator 28, the controller 20 may then cause the output file to be initiated on the selected quantum computing system 18.

As an example, assume that a user 34 develops a quantum program that manipulates a qubit on one quantum computing system and teleports physical characteristics of the qubit to another quantum computing system, and thus the quantum program requires a qubit teleportation service. The quantum program comprises a plurality of programming instructions 36 written in a first quantum programming language. For purposes of illustration, assume that the plurality of programming instructions 36 are written in the PL1 quantum programming language (which, in practice, could be any quantum programming language). The user 34 manipulates the computing device 32 to send the programming instructions 36, or a reference to the programming instructions 36, to the controller 20. The controller 20 selects a quantum computing system 18 based on an attribute of the quantum computing system 18. The term "attribute" in this context includes any information in the quantum computing system characteristics 24 as well as any information in the real-time quantum computing system metrics 22. In this example, the controller 20 determines that the programming instructions 36 are written in the PL1 quantum programming language. The controller 20 may make this determination, for example, based on a filename extension of the file that contains the plurality of programming instructions 36. In other implementations, the controller 20 may determine the quantum programming language by providing the programming instructions 36 to a machine learning model (MLM) 38 that has been trained to identify quantum programming languages.

The controller 20 may also determine that the plurality of programming instructions 36 requires a teleportation service. The controller 20 may determine this in any number of ways. In one implementation, the programming instructions 36 may include metadata that identifies certain features of the programming instructions 36, such as quantum services utilized by the programming instructions 36, the quantum programming language of the programming instructions 36, and the like. In another implementation, the controller 20 may parse the programming instructions 36 and search for predetermined keywords in the corresponding quantum programming language that are used to invoke various quantum services, such as a teleportation service. In another implementation, the controller 20 may determine that the plurality of programming instructions 36 requires a teleportation service by providing the programming instructions 36 to a machine learning model (MLM) that has been trained to identify services invoked in quantum programming instructions.

The controller 20 may access the quantum computing system characteristics 24 and determine that the quantum computing systems 18-1 and 18-4 are capable of executing quantum programs written in the PL1 quantum programming language, and thus, the process of translating the plurality of programming instructions 36 may be less processor intensive if the plurality of programming instructions 36 are translated for the quantum computing systems 18-1 and 18-4 rather than for the quantum computing systems 18-2 or 18-3. This is because translations of the plurality of programming instructions 36 for the quantum computing systems 18-1 and 18-4 may only require that certain programming instructions of the plurality of programming instructions 36 be translated. In contrast, translations of the plurality of programming instructions 36 for the quantum computing systems 18-2 and 18-3 will require translations from the PL1 quantum programming language to the PL2 quantum programming language or the PL3 quantum programming language.

The controller 20 may also determine that both quantum computing systems 18-1 and 18-4 offer a teleportation service, and thus that a quantum program generated from the plurality of programming instructions 36 may successfully execute on either the quantum computing system 18-1 or 18-4.

The controller 20 may also access attributes such as the real-time quantum computing system metrics 22 to determine the real-time processor utilization of the quantum computing systems 18-1 and 18-4, the real-time memory utilization of the quantum computing systems 18-1 and 18-4, and the real-time schedule of quantum programs to be executed by the quantum computing systems 18-1 and 18-4. The controller 20 may utilize one or a combination of the real-time metrics 22 to select the quantum computing system 18-1. For example, the real-time processor utilization of the quantum computing system 18-1 may be substantially less than that of the quantum computing system 18-4, or the real-time memory utilization of the quantum computing system 18-1 may be substantially less than that of the quantum computing system 18-4, and/or the real-time schedule may indicate that a quantum program will be executed sooner on the quantum computing system 18-1 than on the quantum computing system 18-4.

The controller 20 may then generate a second plurality of programming instructions 40 based on the programming instructions 36 and a quantum computing system characteristic 24 of the quantum computing system 18-1. The characteristic 24 may comprise, for example, the particular quantum programming language used by the quantum computing system 18-1. In this example, because the quantum computing system 18-1 utilizes the PL1 quantum programming language, and because the plurality of programming instructions 36 are written in the PL1 quantum programming language, the controller 20 selects the translation structure 30-1 to generate the second plurality of programming instructions 40 from the plurality of programming instructions 36. The translation structure 30-1 may indicate, for example, that a limited set of programming instructions must have a particular syntax that may differ from other quantum computing systems that utilize the PL1 quantum programming language. For example, because the quantum computing system characteristics entry 24-1 indicates that the qubit allocation mechanism for the quantum computing system 18-1 is generic and because the quantum computing system characteristics entry 24-4 indicates that the qubit allocation mechanism for the quantum computing system 18-4 is strict, the precise syntax for allocating qubits may differ for the quantum computing system 18-1 and the quantum computing system 18-4. For example, the programming instruction suitable for allocating two qubits on the quantum computing system 18-1 may comprise for example, "Qubits 2". The programming instruction suitable for allocating two qubits on the quantum computing system 18-4 may comprise for example:

map q[0], Address1
map q[1], Address2

After the generation of the second plurality of programming instructions 40, the controller 20 may then select the compiler 26-1 to generate an output file that is suitable for execution by the quantum computing system 18-1. The controller 20 causes the compiler 26-1 to compile the second plurality of programming instructions 40. The compiler 26-1 may successfully compile the second plurality of programming instructions 40 or the compiler 26-1 may detect an error in the second plurality of programming instructions 40 and emit information that indicates that the second plurality of programming instructions 40 did not properly compile. If the second plurality of programming instructions 40 did not properly compile, the controller 20 may submit programming instructions that did not properly compile and the information that indicates that the second plurality of programming instructions 40 did not properly compile to an MLM that has been trained to output alternative programming instructions that may be used in place of programming instructions that do not properly compile. The controller 20 may then modify the second plurality of programming instructions 40 accordingly and again cause the compiler 26-1 to compile the second plurality of programming instructions 40.

If the compiler 26-1 successfully compiles the second plurality of programming instructions 40, the compiler 26-1 generates an output file. The controller 20 may then select the simulator 28-1, which corresponds to the quantum computing system 18-1, and provide the output file to the simulator 28-1 to cause the simulator 28-1 to simulate the execution of the output file on the quantum computing system 18-1. The controller 20 may determine that the output file successfully executed in the simulator 28-1. In response, the controller 20 may then cause the output file to be initiated on the quantum computing system 18-1. For example, the controller 20 may send the output file, or a reference to the output file, to a scheduler on the quantum computing system 18-1 to schedule the output file for execution.

As another example, assume that the plurality of programming instructions 36 are written in the PL3 quantum programming language and require the teleportation service. The user 34 manipulates the computing device 32 to send the programming instructions 36, or a reference to the programming instructions 36, to the controller 20. The controller 20 selects a quantum computing system 18 based on an attribute of the quantum computing system 18. In this example, the controller 20 determines that the programming instructions 36 are written in the PL3 quantum programming language. The controller 20 also determines that the plurality of programming instructions 36 require the teleportation service. The controller 20 may access the quantum computing system characteristics 24 and determine that the quantum computing system 18-3 is capable of executing quantum programs written in the quantum programming language PL3. The controller 20, however, determines that the quantum computing system 18-3 does not offer the teleportation service. The controller 20 determines that both quantum computing systems 18-1 and 18-4 offer the teleportation service, and thus that a quantum program generated from the plurality of programming instructions 36 may successfully execute on either the quantum computing system 18-1 or 18-4.

The controller 20 access additional attributes such as the real-time quantum computing system metrics 22 to determine the real-time processor utilization of the quantum computing systems 18-1 and 18-4, the real-time memory utilization of the quantum computing systems 18-1 and 18-4, and the real-time schedule of quantum programs to be executed by the quantum computing systems 18-1 and 18-4. The controller 20 may utilize one or a combination of the real-time metrics 22 to select the quantum computing system 18-4. For example, the real-time processor utilization of the quantum computing system 18-4 may be substantially less than that of the quantum computing system 18-1, or the real-time memory utilization of the quantum computing system 18-4 may be substantially less than that of the quantum computing system 18-1, and/or the real-time schedule may indicate that a quantum program will be executed sooner on the quantum computing system 18-4 than on the quantum computing system 18-1.

The controller 20 may then generate the second plurality of programming instructions 40 based on the programming instructions 36 and a quantum computing system characteristic 24 of the quantum computing system 18-4. The characteristic may comprise, for example, a particular quantum programming language used by the quantum computing system 18-4. In this example, the controller 20 determines that the quantum computing system 18-4 can execute programs written in either of the PL1 or PL2 quantum computing languages. The controller 20 may have access to preferable translation configuration information such that it may be indicated that a translation from the PL3 quantum computing language to the PL2 quantum computing language takes less processor utilization than a translation from the PL3 quantum computing language to the PL1 quantum computing language.

The controller 20 selects the translation structure 30-14 to generate the second plurality of programming instructions 40 from the plurality of programming instructions 36. The translation structure 30-14 contains information, such as program instruction mappings, that the controller 20 uses to translate the first plurality of programming instructions 36 written in the PL3 quantum programming language to the first plurality of programming instructions 36 in the PL2 quantum programming language.

The controller 20 may then select the compiler 26-4 to generate an output file that is suitable for execution by the quantum computing system 18-4. The controller 20 causes the compiler 26-4 to compile the second plurality of programming instructions 40. The compiler 26-4 may successfully compile the second plurality of programming instructions 40 and generate an output file suitable for execution on the quantum computing system 18-4.

The controller 20 may then select the simulator 28-4, which corresponds to the quantum computing system 18-4, and provide the output file to the simulator 28-4 to cause the simulator 28-4 to simulate the execution of the output file on the quantum computing system 18-4. The controller 20 may determine that the output file successfully executed in the simulator 28-4. In response, the controller 20 may then cause the output file to be initiated on the quantum computing system 18-4. For example, the controller 20 may send the output file, or a reference to the output file, to a scheduler on the quantum computing system 18-4 to schedule the output file for execution.

It is noted that, because the controller 20 is a component of the computing device 12, functionality implemented by the controller 20 may be attributed to the computing device 12 generally. Moreover, in examples where the controller 20 comprises software instructions that program the processor device 14 to carry out functionality discussed herein, functionality implemented by the controller 20 may be attributed herein to the processor device 14.

Figure 2:
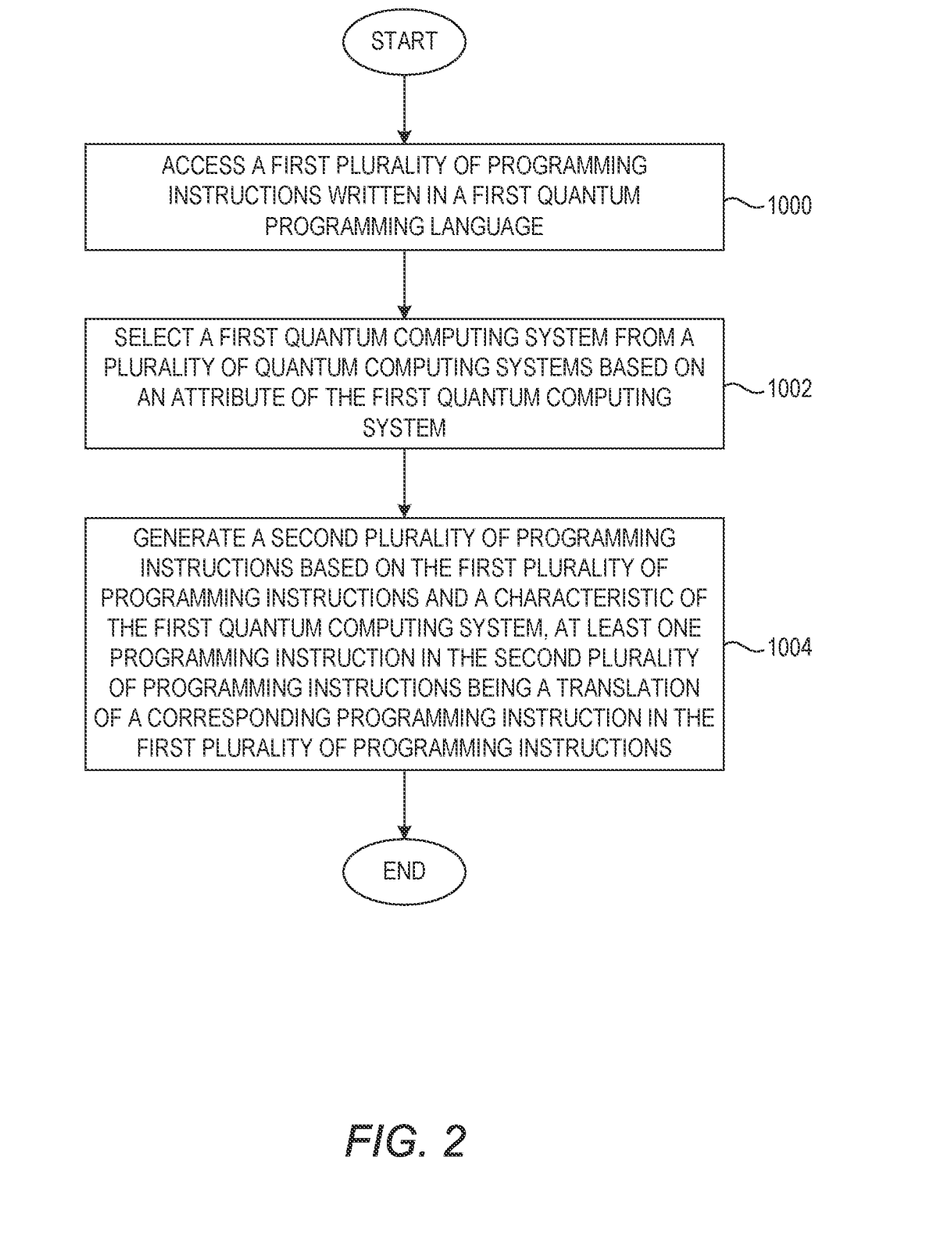
FIG. 2 is a flowchart of a method for dynamic quantum computing system selection and quantum program compilation according to one implementation.

FIG. 2 is a flowchart of a method for dynamic quantum computing system selection and quantum program compilation according to one implementation. FIG. 2 will be discussed in conjunction with FIG. 1. The computing device 12 accesses the first plurality of programming instructions 36 written in a first quantum programming language (FIG. 2, block 1000). The computing device 12 selects the quantum computing system 18-1 from the plurality of quantum computing systems 18 based on an attribute of the quantum computing system 18-1 (FIG. 2, block 1002). The computing device 12 generates the second plurality of programming instructions 40 based on the first plurality of programming instructions 36 and a characteristic of the quantum computing system 18-1, at least one programming instruction in the second plurality of programming instructions 40 being a translation of a corresponding programming instruction in the first plurality of programming instructions 36 (FIG. 2, block 1004).

Figure 3:
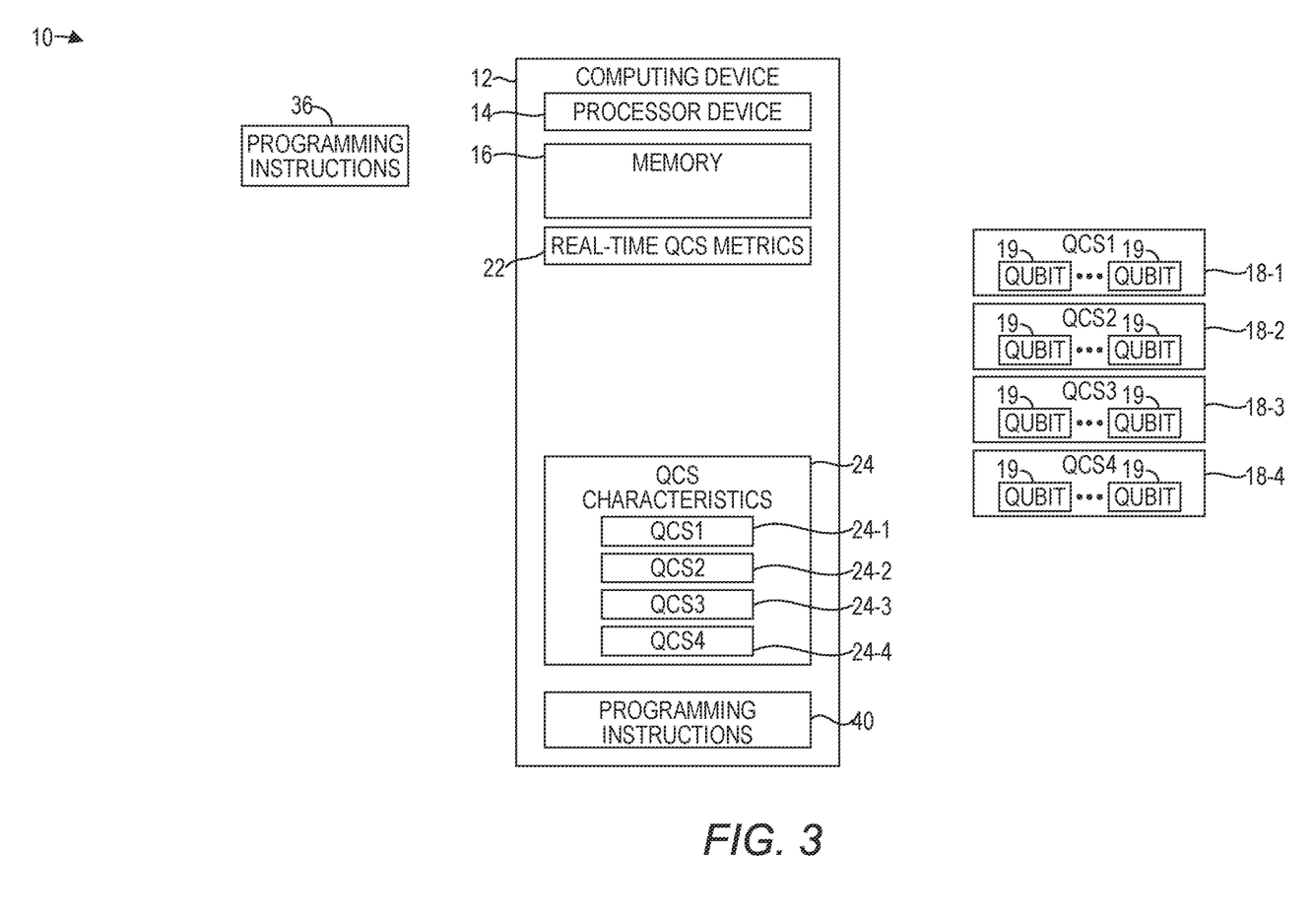
FIG. 3 is a simplified block diagram of the environment illustrated in FIG. 1 according to one implementation.

FIG. 3 is a simplified block diagram of the environment 10 illustrated in FIG. 1 according to one implementation. The computing device 12 includes the memory 16 and is coupled to the processor device 14. The processor device 14 is to access the first plurality of programming instructions 36 written in a first quantum programming language. The processor device 14 selects the quantum computing system 18-1 from the plurality of quantum computing systems 18-1-18-4 based on an attribute of the quantum computing system 18-1. The processor device 14 generates the second plurality of programming instructions based on the first plurality of programming instructions 36 and a characteristic of the quantum computing system 18-1, at least one programming instruction in the second plurality of programming instructions 40 being a translation of a corresponding programming instruction in the first plurality of programming instructions 36.

Figure 4:
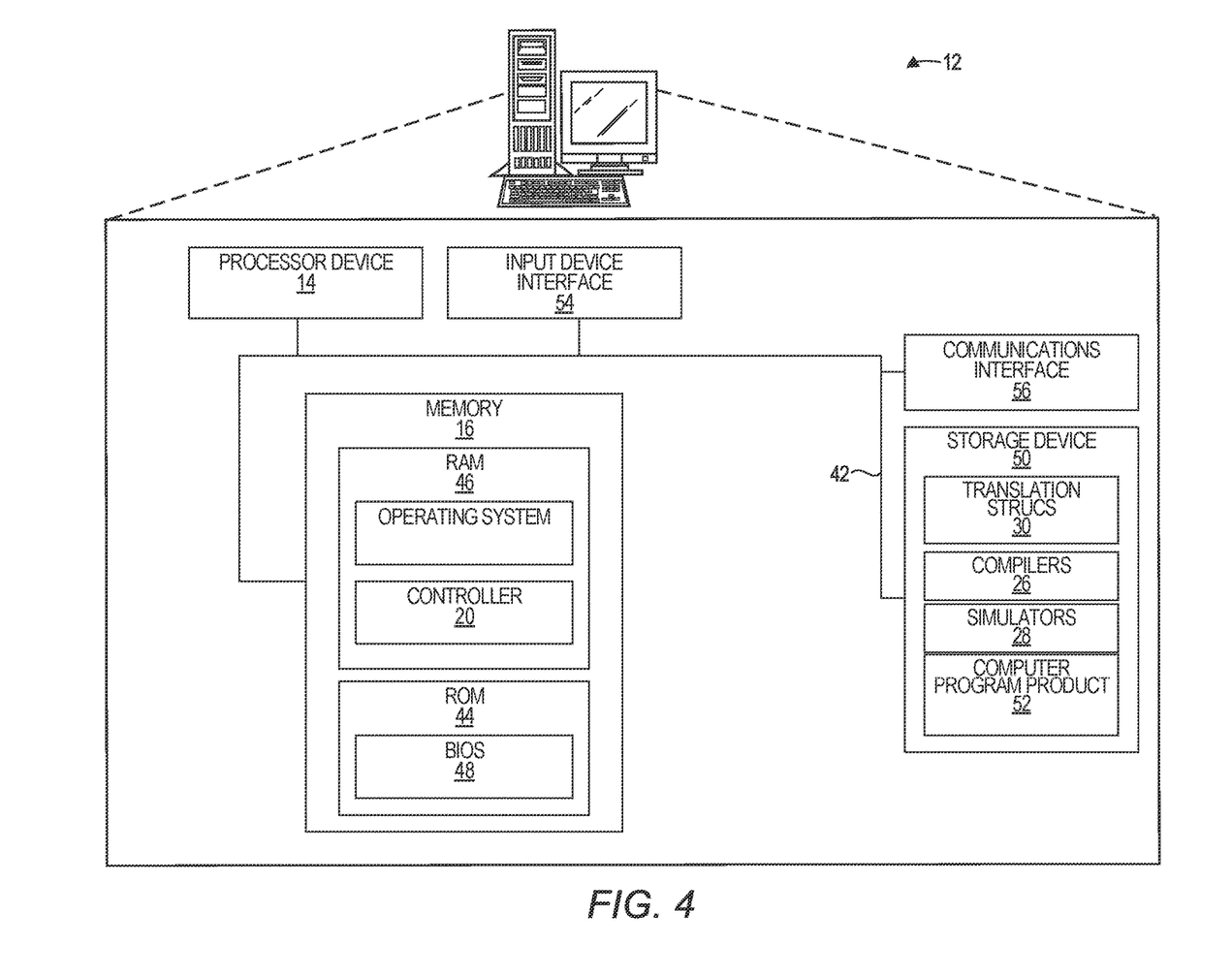
FIG. 4 is a block diagram of a computing device suitable for implementing examples according to one example.

FIG. 4 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 may be a classical computing device or a quantum computing system. The computing device 12 includes the processor device 14, the system memory 16, and a system bus 42. The system bus 42 provides an interface for system components including, but not limited to, the system memory 16 and the processor device 14. The processor device 14 can be any commercially available or proprietary processor.

The system bus 42 may be any of several types of bus structures that may further interconnect to a memory bus (with or without a memory controller), a peripheral bus, and/or a local bus using any of a variety of commercially available bus architectures. The system memory 16 may include non-volatile memory 44 (e.g., read-only memory (ROM), erasable programmable read-only memory (EPROM), electrically erasable programmable read-only memory (EEPROM), etc.), and volatile memory 46 (e.g., random-access memory (RAM)). A basic input/output system (BIOS) 48 may be stored in the non-volatile memory 44 and can include the basic routines that help to transfer information between elements within the computing device 12. The volatile memory 46 may also include a high-speed RAM, such as static RAM, for caching data.

The computing device 12 may further include or be coupled to a non-transitory computer-readable storage medium such as a storage device 50, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 50 and other drives associated with computer-readable media and computer-usable media may provide non-volatile storage of data, data structures, computer-executable instructions, and the like.

A number of modules can be stored in the storage device 50 and in the volatile memory 46, including an operating system and one or more program modules, such as the controller 20, which may implement the functionality described herein in whole or in part. All or a portion of the examples may be implemented as a computer program product 52 stored on a transitory or non-transitory computer-usable or computer-readable storage medium, such as the storage device 50, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the controller 20 in the volatile memory 46, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 54 that is coupled to the system bus 42 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 56 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
accessing, by a computing device comprising a processor device, a first plurality of programming instructions written in a first quantum programming language;
selecting, by the computing device, a first quantum computing system from a plurality of quantum computing systems based on an attribute of the first quantum computing system;
determining, by the computing device that the first quantum computing system is unable to execute programming instructions written in a first quantum programming language and is able to execute programming instructions written in a second quantum programming language or a third quantum programming language;
accessing, by the computing device, preferable translation configuration information that indicates that a translation from the first quantum programming language to a second quantum programming language takes less processor utilization than a translation from the first quantum programming language to a third quantum programming language;
generating, based at least in part on the preferable translation configuration information and a translation structure corresponding to the first plurality of programming instructions, a second plurality of programming instructions from the first plurality of programming instructions;
selecting a simulator of a plurality of different simulators, the simulator corresponding to the first quantum computing system;
providing an output file compiled from the second plurality of programming instructions to the simulator; and
simulating, by the simulator, an execution of the output file on the first quantum computing system.

2. The method of claim 1, wherein the attribute comprises a real-time load metric that quantifies a current load of the first quantum computing system.

3. The method of claim 1, wherein the attribute comprises a quantum programming language identifier and wherein selecting the first quantum computing system from the plurality of quantum computing systems comprises determining that the quantum programming language identifier identifies the first quantum programming language and that the first plurality of programming instructions is written in the first quantum programming language.

4. The method of claim 1, wherein the attribute comprises a quantum service offered by the first quantum computing system that is not offered by at least some of the other quantum computing systems of the plurality of quantum computing systems, and wherein selecting the first quantum computing system from the plurality of quantum computing systems comprises determining that the first plurality of programming instructions utilize the quantum service.

5. The method of claim 1, wherein generating the second plurality of programming instructions from the first plurality of programming instructions comprises translating the first plurality of programming instructions from the first quantum programming language to the second plurality of programming instructions in the second quantum programming language.

6. The method of claim 1, wherein generating the second plurality of programming instructions from the first plurality of programming instructions comprises modifying at least one programming instruction of the first plurality of programming instructions based on a qubit allocation mechanism.

7. The method of claim 1 further comprising:
selecting a compiler from a plurality of compilers; and
causing the compiler to compile the second plurality of programming instructions.

8. The method of claim 7, further comprising:
determining that the compiler successfully compiled the second plurality of programming instructions and generated the output file.

9. The method of claim 8, further comprising:
determining that the output file successfully executed in the simulator; and
in response to determining that the output file successfully executed in the simulator, causing the output file to be initiated on the first quantum computing system.

10. The method of claim 7, further comprising:
determining that the compiler did not successfully compile the second plurality of programming instructions;
determining that a first set of programming instructions of the second plurality of programming instructions did not compile;
modifying the first set of programming instructions with a second set of programming instructions that provide a same functionality; and
causing the compiler to compile the second plurality of programming instructions.

11. The method of claim 7, further comprising:
determining that the compiler successfully compiled the second plurality of programming instructions and generated the output file; and
causing the output file to be initiated on the first quantum computing system.

12. A computing device, comprising:
a memory; and
a processor device coupled to the memory to:
access a first plurality of programming instructions written in a first quantum programming language;
select a first quantum computing system from a plurality of quantum computing systems based on an attribute of the first quantum computing system;
determine that the first quantum computing system is unable to execute programming instructions written in a first quantum programming language and is able to execute programming instructions written in a second quantum programming language or a third quantum programming language;

access preferable translation configuration information that indicates that a translation from the first quantum programming language to a second quantum programming language takes less processor utilization than a translation from the first quantum programming language to a third quantum programming language;

generate, based at least in part on the preferable translation configuration information and a translation structure corresponding to the first plurality of programming instructions, a second plurality of programming instructions from the first plurality of programming instructions;

select a simulator of a plurality of different simulators, the simulator corresponding to the first quantum computing system;

provide an output file compiled from the second plurality of programming instructions to the simulator; and simulate, by the simulator, an execution of the output file on the first quantum computing system.

13. The computing device of claim 12, wherein the attribute comprises a quantum programming language identifier and wherein to select the first quantum computing system from the plurality of quantum computing systems, the processor device is further to determine that the quantum programming language identifier identifies the first quantum programming language and that the first plurality of programming instructions is written in the first quantum programming language.

14. The computing device of claim 12, wherein the attribute comprises a quantum service offered by the first quantum computing system that is not offered by at least some of the other quantum computing systems of the plurality of quantum computing systems, and wherein to select the first quantum computing system from the plurality of quantum computing systems, the processor device is further to determine that the first plurality of programming instructions utilize the quantum service.

15. The computing device of claim 12, wherein to generate the second plurality of programming instructions from the first plurality of programming instructions, the processor device is further to translate the first plurality of programming instructions from the first quantum programming language to the second plurality of programming instructions in the second quantum programming language.

16. The computing device of claim 12, wherein to generate the second plurality of programming instructions from the first plurality of programming instructions, the processor device is further to modify at least one programming instruction of the first plurality of programming instructions based on a qubit allocation mechanism.

17. A non-transitory computer-readable storage medium that includes executable instructions to cause a processor device to:

access a first plurality of programming instructions written in a first quantum programming language;

select a first quantum computing system from a plurality of quantum computing systems based on an attribute of the first quantum computing system;

determine that the first quantum computing system is unable to execute programming instructions written in a first quantum programming language and is able to execute programming instructions written in a second quantum programming language or a third quantum programming language;

access preferable translation configuration information that indicates that a translation from the first quantum programming language to a second quantum programming language takes less processor utilization than a translation from the first quantum programming language to a third quantum programming language;

generate, based at least in part on the preferable translation configuration information and a translation structure corresponding to the first plurality of programming instructions, a second plurality of programming instructions from the first plurality of programming instructions;

select a simulator of a plurality of different simulators, the simulator corresponding to the first quantum computing system;

provide an output file compiled from the second plurality of programming instructions to the simulator; and simulate, by the simulator, an execution of the output file on the first quantum computing system.

18. The non-transitory computer-readable storage medium of claim 17, wherein the attribute comprises a quantum programming language identifier and wherein to select the first quantum computing system from the plurality of quantum computing systems, the instructions further cause the processor device to determine that the quantum programming language identifier identifies the first quantum programming language and that the first plurality of programming instructions is written in the first quantum programming language.

19. The non-transitory computer-readable storage medium of claim 17, wherein the attribute comprises a quantum service offered by the first quantum computing system that is not offered by at least some of the other quantum computing systems of the plurality of quantum computing systems, and wherein to select the first quantum computing system from the plurality of quantum computing systems, the instructions further cause the processor device to determine that the first plurality of programming instructions utilize the quantum service.

20. The non-transitory computer-readable storage medium of claim 17, wherein to generate the second plurality of programming instructions from the first plurality of programming instructions, the instructions further cause the processor device to translate the first plurality of programming instructions from the first quantum programming language to the second plurality of programming instructions in the second quantum programming language.

* * * * *